United States Patent
Ruocco et al.

(10) Patent No.: US 7,097,762 B1
(45) Date of Patent: Aug. 29, 2006

(54) MODULAR WASTE WATER TREATMENT SYSTEM

(75) Inventors: Joseph John Ruocco, Colwich, KS (US); Paul John Russell, Wichita, KS (US)

(73) Assignees: ICM, Inc., Colwich, KS (US); Phoenix Bio-Systems, Inc., Colwich, KS (US)

( * ) Notice: Subject to any disclaimer, the term of this patent is extended or adjusted under 35 U.S.C. 154(b) by 272 days.

(21) Appl. No.: 10/402,477

(22) Filed: Mar. 28, 2003

Related U.S. Application Data
(60) Provisional application No. 60/368,773, filed on Mar. 29, 2002.

(51) Int. Cl.
 C02F 3/00 (2006.01)
 B01D 53/14 (2006.01)

(52) U.S. Cl. .................. 210/104; 210/241; 210/195.1; 210/196; 210/180; 210/205; 95/235

(58) Field of Classification Search ............... 210/241, 210/194, 195.1, 196, 188, 742, 743, 175, 210/180, 97, 104, 205; 95/235
See application file for complete search history.

(56) References Cited

U.S. PATENT DOCUMENTS

| | | | |
|---|---|---|---|
| 3,371,033 A | 2/1968 | Simmons et al. |
| 3,920,550 A | 11/1975 | Farrell, Jr. et al. |
| 3,956,128 A | 5/1976 | Turner |
| 4,411,780 A | 10/1983 | Suzuki et al. |
| 4,469,599 A | 9/1984 | Gros et al. |
| 4,536,286 A | 8/1985 | Nugent |
| 4,561,974 A | 12/1985 | Bernard et al. |
| 4,582,600 A | 4/1986 | Atkinson et al. |
| 4,609,460 A | 9/1986 | Vellinga |
| 4,622,147 A | 11/1986 | Vellinga |

(Continued)

FOREIGN PATENT DOCUMENTS

| | | |
|---|---|---|
| CA | 1155473 | 10/1983 |
| CA | 1183616 | 3/1985 |
| CA | 2022232 | 2/1991 |
| CA | 1295058 | 1/1992 |
| CA | 2084090 | 1/1992 |
| CA | 2102219 | 10/1992 |
| CA | 2079578 | 6/1993 |
| CA | 2080030 | 6/1993 |
| CA | 2104433 | 2/1994 |
| CA | 2160373 | 10/1994 |
| CA | 1334036 | 1/1995 |
| CA | 2179135 | 12/1996 |
| CA | 2192608 | 6/1997 |
| CA | 2243341 | 7/1997 |
| CA | 2269967 | 10/1999 |
| CA | 2379820 | 9/2002 |

Primary Examiner—Chester T. Barry

(57) ABSTRACT

The modular waste water treatment system receives waste water from a waste water source containing organic waste and produces a treated water effluent. The modular system includes bioreactors and a bioreactor support module. The bioreactors receive a waste water mixture from the bioreactor support module and produce treated water substantially free of organic waste. The bioreactor support module is a transportable unit fabricated upon a frame adapted for transport by a truck upon a public roadway. The bioreactor support module includes items of equipment needed for conditioning waste water for intake by the bioreactors, items of equipment for receiving, processing and discharging treated water from the bioreactors and may include other items of equipment for receiving and processing other byproducts from the bioreactors. The transportable bioreactor support module is sized to support the operation of between one and preferably as many as six bioractors. Accordingly, the modular waste water treatment system can be fabricated off site in a controlled shop environment, transported to a site, placed at a site and even later expanded to include additional bioreactors for increased capacity with a minimum of cost, time and effort.

26 Claims, 5 Drawing Sheets

U.S. PATENT DOCUMENTS

| | | |
|---|---|---|
| 4,627,917 A | 12/1986 | Morper |
| 4,659,460 A | 4/1987 | Muller et al. |
| 4,707,254 A | 11/1987 | Vellinga |
| 4,915,841 A | 4/1990 | Lagana et al. |
| 4,940,546 A | 7/1990 | Vogelpohl et al. |
| 5,030,353 A | 7/1991 | Stuth |
| 5,096,579 A | 3/1992 | Jordan et al. |
| 5,126,238 A | 6/1992 | Gebhard et al. |
| 5,205,935 A | 4/1993 | Ruocco |
| 5,230,794 A | 7/1993 | Heijnen et al. |
| 5,254,253 A | 10/1993 | Behmann |
| 5,328,105 A | 7/1994 | Sims et al. |
| 5,336,398 A | 8/1994 | Russell et al. |
| 5,338,447 A | 8/1994 | Vellinga |
| 5,417,937 A | 5/1995 | Voigt et al. |
| 5,534,159 A | 7/1996 | Krieger |
| 5,565,098 A | 10/1996 | Vellinga |
| 5,755,973 A | 5/1998 | Krieger |
| 5,773,526 A | 6/1998 | Van Dijk |
| 5,855,785 A | 1/1999 | Heijnen et al. |
| 5,961,830 A | 10/1999 | Barnett |
| 5,972,216 A | 10/1999 | Acernese et al. |
| 5,972,219 A | 10/1999 | Habets et al. |
| 5,976,868 A | 11/1999 | Buisman |
| 5,985,150 A | 11/1999 | Versprille et al. |
| 6,126,827 A | 10/2000 | Johnson, Jr. et al. |
| 6,139,730 A | 10/2000 | Buehler et al. |
| 6,156,205 A | 12/2000 | Buisman et al. |
| 6,159,380 A | 12/2000 | Russell et al. |
| 6,221,652 B1 | 4/2001 | Janssen et al. |
| 6,309,553 B1 | 10/2001 | Lanting et al. |
| 6,372,139 B1 | 4/2002 | Habets et al. |
| 6,616,833 B1 | 9/2003 | Lynch |
| 6,623,640 B1 | 9/2003 | Lanting et al. |
| 6,758,886 B1 | 7/2004 | Vellinga |
| 6,767,464 B1 | 7/2004 | Boyd et al. |

MODULAR WASTE WATER TREATMENT SYSTEM

CROSS REFERENCE TO A RELATED APPLICATION

This application claims the benefit of U.S. Provisional Patent Application No. 60/368,773 filed 29 Mar. 2002.

FIELD OF THE INVENTION

This invention relates to a modular system having at least one bioreactor for the anaerobic treatment of waste water and a bioreactor support module that houses support equipment for operating one or more bioreactors.

BACKGROUND OF THE INVENTION

Anaerobic waste water treatment provides a means for converting dissolved organic waste into methane and carbon dioxide. More particularly, anaerobic waste water treatment is often referred to as a pre-treatment process since the discharge from an anaerobic waste water treatment process often needs further treatment prior to discharge into the environment. Dissolved organic waste in a volume of waste water is often measured by "chemical oxygen demand" or "COD". COD is usually given as a unit weight per unit volume or may be given as a unit weight in a given time period to rate the treatment capacity of a facility. COD reflects the amount of organic material by unit weight present in a unit volume of water.

An anaerobic waste water treatment process is particularly advantageous because only a small percentage of carbon and nitrogen in the organic waste is converted by the anaerobic microbial cultures into new cell mass. This results in far less waste material arising from the excess production of microbes. Moreover, the anaerobic digestion of waste can be conducted within a much smaller volume of space than with an aerobic process. Anaerobic waste water treatment is particularly adapted for treating the waste water produced by alcohol fermentation processes such as might be found in brewery or in a facility that produces fuel grade ethanol. Waste water produced by such facilities generally contains materials which can be most easily digested in an anaerobic process.

Typically, an anaerobic waste water treatment facility includes bioreactors, which are usually tanks having fluidized beds composed of many thousands of microbial granules containing colonies of microbes. These microbial granules are colonies consisting of various organisms. The microscopic organisms in these granules ingest organic waste and convert it primarily into methane and carbon dioxide. Other support equipment regulates the make up and the flow rate of the feed moving into and the products moving out of the bioreactors. Often, in anaerobic waste water treatment systems, some of the liquid product from the bioreactors is discharged from the system as treated water while most of the liquid product from the bioreactors is routed to a recycle tank. The recycle tank in such a system initially receives waste water for treatment and mixes it with recycled, treated water from the bioreactors. A recycle pump conveys the resulting mixture of waste water and recycled treated water to the bioreactors. The recycle tank can also be used as the place for conditioning the temperature, pH, and the nutrient content of the mixture entering the bioreactors in order to maintain the health of the above described microbial organisims. The bioreactors also produce carbon dioxide gas and methane gas. Methane gas does not dissolve in water and so it is collected at the top of the bioreactors. The methane gas can be routed to an outside process to help supply energy to that outside process or it can be flared off.

In the past, anaerobic waste water treatment systems have been constructed on site to meet the waste water treatment needs at that site. Typically, all of the components of the anaerobic waste water treatment system are sized, designed and constructed to meet the needs of the site. Since each component must be placed and installed on site, the cost of adding such a system capable of processing on the order of thousands of pounds of dissolved organic waste per day can be significant. Such a custom designed system would often require significant redesign in order to expand or enlarge a system to process larger amounts of waste. Accordingly, what is needed is a modular system that can be built off site, transported and then installed with a minimum of effort. A modular system is needed having standard support equipment capable of supporting the operation of between one and a significantly larger number of bioreactors so that bioreactors may be added at a later time with little additional cost.

Thus, there has long been a need in the industry, for a modular system for digesting organic waste that can be constructed and mostly assembled off site, transported and then installed at a desired location. There has also been a long felt need in the industry to have a modular system that is expandable to operate between one and a significantly larger number of bioreactors without having to change or modify other basic equipment in the modular system. Still further, there has been a long felt need in the industry to have a system that has its components placed within a small area so that an operator can access those components with an absolute minimum of time and effort.

SUMMARY OF THE INVENTION

Accordingly, it is an object of this invention to provide an improved modular, biological, waste treatment system that can be fabricated off site and easily transported to a desired location in a minimum number of transportable units. Another object of this invention is to provide an improved modular anaerobic, biological waste treatment system that has a standard support equipment module including components sized to accommodate one or more bioreactors, so that a system, once installed can be easily and inexpensively expanded to accommodate a larger number of bioreactors thereby multiplying the capacity of the waste treatment system with a minimum of additional cost. Yet another object of this invention is to provide a waste treatment system that has its components placed within a small area so that they are easily and quickly accessible to an operator.

These and other objects of the invention are attained in an improved, modular, anaerobic, waste water treatment system for removing organic waste from waste water to produce treated water or effluent that is suitable for re-use or further treatment prior to release. The system includes a bioreactor support module and at least one anaerobic bioreactor. The bioreactor support module includes components necessary for receiving waste water, mixing the waste water with bioreactor recycle water and otherwise supporting the operation of one or several bioreactors. The bioreactor support module includes a frame sized for over-the-road transport via truck to which is mounted a recycle tank, a recycle pump, a effluent discharge pump, a decarbonator, a bio-gas scrubber, a flare, a nutrient tank and a control panel as well as appropriate in-line level and flow control devices which maintain flow, temperature and pH within the system. The recycle tank receives waste water and formulates a mixture from waste water, recycled treated water produced by the bioreactors and nutrients which are mixed and fed back to the bioreactors. Like the other components in the bioreactor support module, the recycle tank is preferably sized to support the operation of up to six bioreactors but may also be sized to support more bioreactors. Within the nutrient tank, a mixture is formulated that includes nutrients required by the anaerobic organism present in the bioreactors. A nutrient feed pump responds to signals from the control panel, as the control panel monitors the amount of waste water fed into the system and conveys the amounts of nutrients into the recycle tank that are needed to sustain the microbial cultures in the bioreactors. The amount, temperature and pH of the liquid in the recycle tank are also monitored and controlled by the control panel. The control panel responds to values outside pre-determined limits by changing the feed rates in lines leading to the recycle tank. The control panel may activate a valve to introduce a caustic solution into the recycle tank to adjust pH. The control panel may also cause sparge steam to enter the recycle tank to increase recycle tank temperature to a temperature within an optimum range. Accordingly, the control panel functions to insure that the mixture received by the bioreactors from the recycle tank is optimized for the microbial cultures in the bioreactors. The control panel also monitors the level in the recycle tank and adjusts the discharge from the system to maintain a pre-determined level in the recycle tank.

In the preferred embodiment, the recycle pump is sized to feed the mixture from the recycle tank to as many as six anaerobic bioreactors. The bioreactors contain fluidized beds of granular anaerobic bacterial colonies. The mixture from the recycle tank enters each bioreactor at the base of the bioreactor and interacts with the microbial bed as the microbial colonies convert organic waste in the water to methane gas and carbon dioxide. As the granular microbial colonies convert the organic waste, they sprout methane gas bubbles and rise to the top of the bioreactor. Separators situated at the top of each bioreactor return the granules back to the bottom of the bioreactor as they shed their methane gas bubbles. The carbon dioxide that is given off is soluble in water. A gas product consisting mostly of methane gas exits the top of the bioreactor, while treated water flows by gravity from the top of the bioreactors back to the decarbonator which is mounted to the frame of the bioreactor support module.

The decarbonator strips dissolved carbon dioxide from the bioreactor effluent. The effluent that exits the decarbonator is split into a recycle line and a discharge ine. The recycle line carries most of the effluent back to the recycle tank while the discharge line conveys some of the effluent to the effluent discharge pump which discharges the treated effluent.

The gas product venting from the tops of the bioreactors contains mostly methane gas but also contains small amounts of hydrogen sulfide gas. Accordingly, the gas product is piped to a bio-gas scrubber containing iron sponge material that captures the hydrogen sulfide and separates it from the methane gas. Condensate from the bio-gas scrubber is routed back to the recycle tank while the remaining methane gas is either burned off by the bio-gas flare mounted to the frame of the bioreactor support module or is routed to be mixed with other natural gas supplies to augment the energy available for other processes.

As can be seen from the forgoing description, the bioreactor support module carries equipment that encompasses substantially all of the waste water treatment process except the bioreactors. Accordingly, the complex arrangement of components, pumps and interconnecting piping of the bioreactor support module can be assembled in a standardized, manufacturing setting instead of at a construction site. The bioreactor support module can be designed to have standardized interfaces with the facility that it services and with a group of bioreactors that are also located and arranged in a standardized manner.

BRIEF DESCRIPTION OF THE DRAWINGS

The invention and its many attendant objects and advantages will become better understood upon reading the following detailed description of the preferred embodiment in conjunction with the following drawings, wherein.

DETAILED DESCRIPTION OF THE INVENTION

Figure 1:
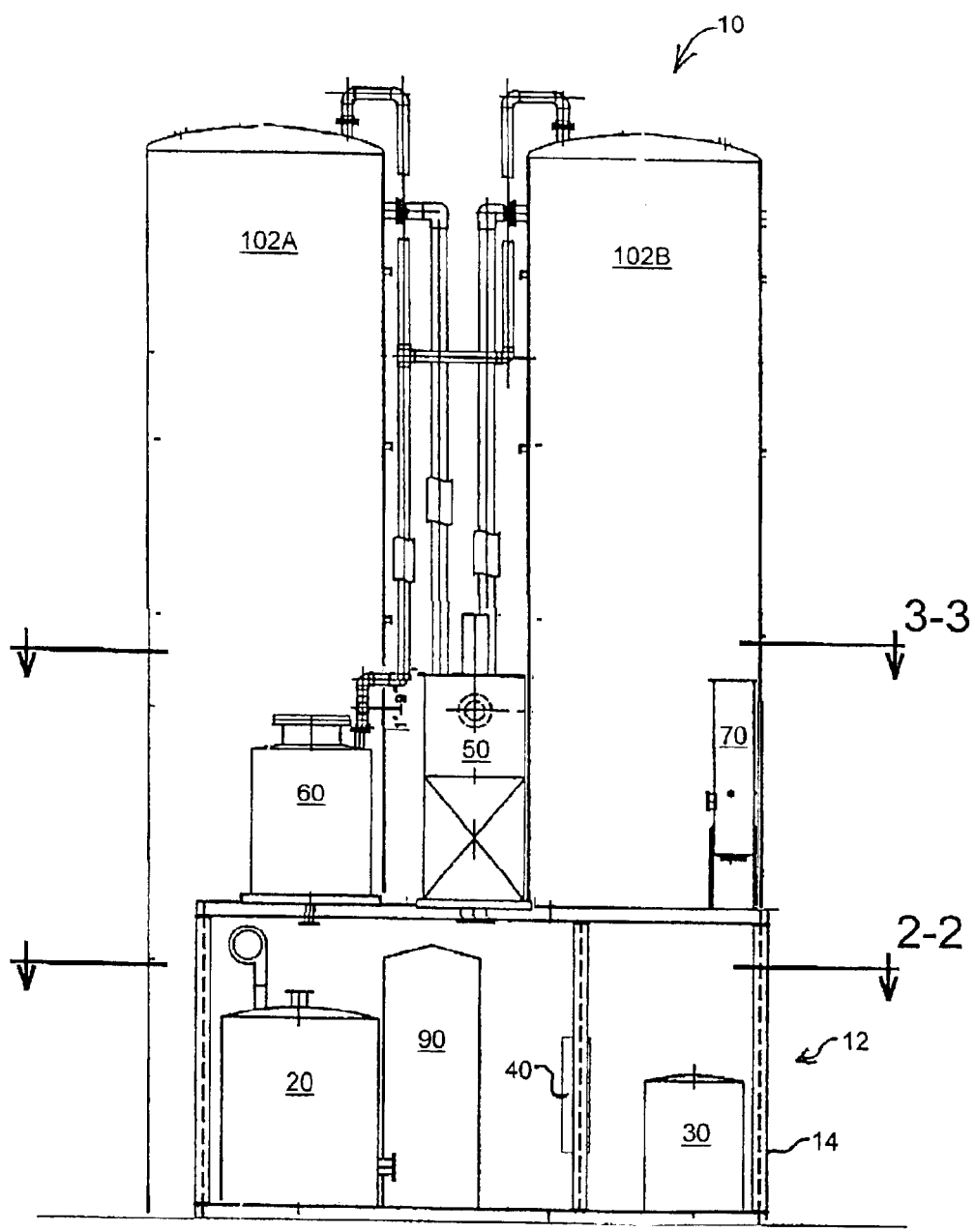
FIG. 1 is an elevation of the bioreactor support module shown with two bioreactors.

Turning now to the drawings, wherein like reference numerals identify identical or corresponding elements, and more particularly to FIG. 1 thereof, a modular waste water treatment system 10 is shown including a bioreactor support module 12 and bioreactors 102A and 102B.

Bioreactor support module 12 is generally a transportable module. Preferably, bioreactor support module 12 houses all of the control equipment for treatment system 10, systems for adding needed nutrients and chemicals, pumps for re-circulation and product discharge and heat control systems required to maintain appropriate operating temperatures. Bioreactor support module 12 includes a frame 14 to which is mounted a number of items of equipment. Frame 14 is preferably sized to fit on the trailer bed of a large tractor trailer for highway transport and is preferably fabricated from structural steel. The items of equipment mounted on the upper level of frame 14 may be removed temporarily during highway transport, however, all of the items of equipment mounted on the lower level may be installed in a factory setting prior to highway transport. The major items of equipment mounted to the lower level of frame 14 are a recycle tank 20, a nutrient tank 30, a control panel 40, a discharge pump 110, a recycle pump 24 and a nutrient pump 32. A decarbonator 50, a bio-gas scrubber 60 and a bio-gas flare 70 are mounted to the upper level of frame 14. However, decarbonator 50, bio-gas scrubber 60 and bio-gas flare 70 while significantly enhancing the efficiency of the system are not required for the operation of the system.

Figure 2:
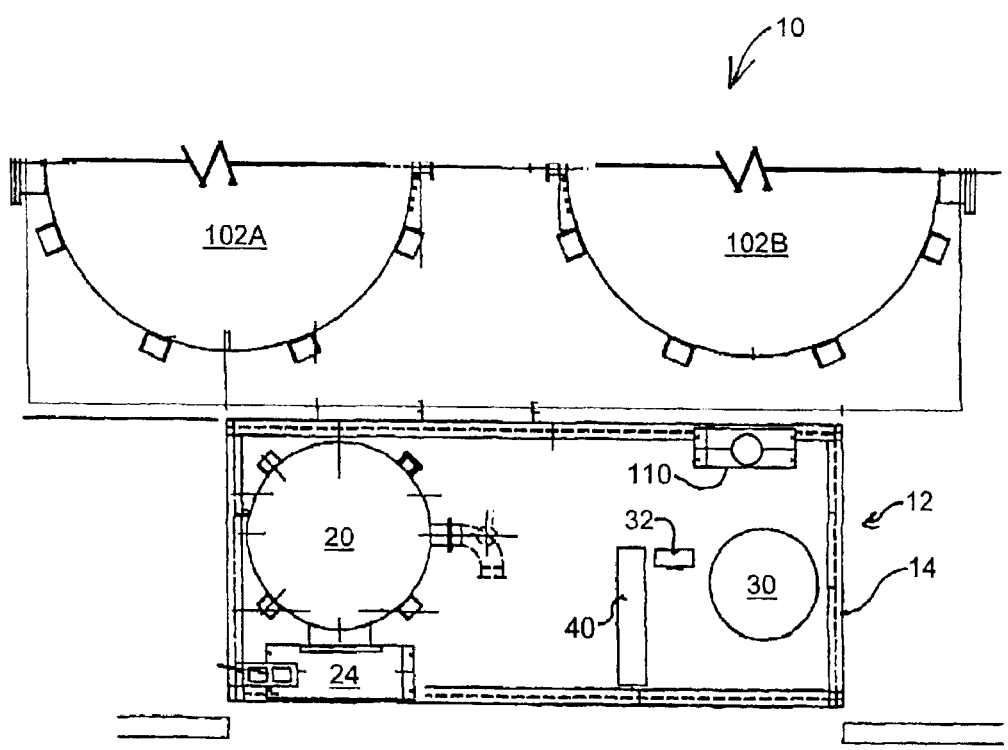
FIG. 2 is a sectional view taken from plane 2—2 of FIG. 1 showing primarily the lower level of the bioreactor support module.
Figure 3:
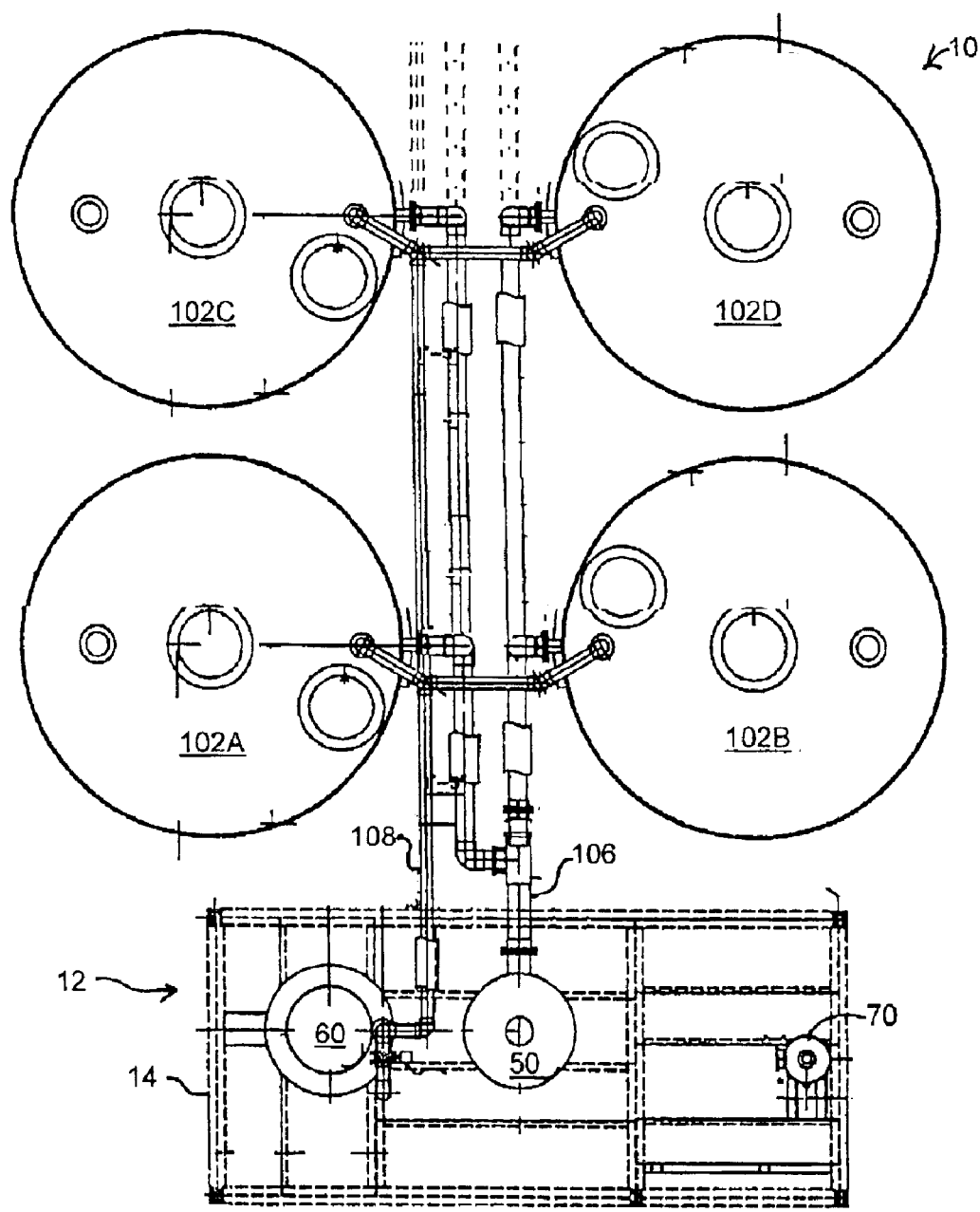
FIG. 3 is a sectional view taken from plane 3—3 of FIG. 1 showing primarily the upper level of the bioreactor support module as well as additional bioreactors.

FIG. 2, is a sectional view taken from plane 2—2 of FIG. 1 showing the lower level of bioreactor support module 12 where a recycle pump 24, a nutrient pump 32 and a effluent discharge pump 110 are also mounted. FIG. 3 is a sectional view taken from plane 3—3 of FIG. 1 showing the upper level of frame 14. FIG. 3 provides further illustration of the relative positions of decarbonator 50, bio-gas scrubber 60 and bio-gas flare 70. In FIG. 3 a line 106 collects and gravity feeds effluent from bioreactors 102A and 102B (and additional bioreactors 102C and 102D) to decarbonator 50 where carbon dioxide gas is stripped from the treated water. Also in FIG. 3, a line 108 conveys methane gas from bioreactors 102A and 102B (and additional bioreactors 102C and 102D) to bio-gas scrubber 60. Other lines passing between the various components shown in FIG. 1, FIG. 2 and FIG. 3 are omitted for clarity. The various lines and pipes connecting the various items of equipment shown in FIG. 1, FIG. 2 and FIG. 3 are diagrammed in FIG. 4A and FIG. 4B.

It is an important feature of this modular system that the system lines 106 and 108, as shown in FIG. 3 include provisions such that they can be easily extended to receive methane and treated water from additional bioreactors 102C and 102D which are preferably substantially identical to bioreactors 102A and 102B. Although not shown in FIG. 3, feed pipes leading to the bioreactors 102A and 102B would be similarly extended and connected with additional bioreactors 102C and 102D. These feed lines and discharge lines can even be further extended to serve two more bioreactors for a total of six bioreactors. Six bioreactors is for practical reasons the preferred maximum number of bioreactors that should be serviced by one bioreactor support module.

Also shown in FIG. 1 is an enclosing structure 90 that extends out between the columns of bioreactors to cover at least the feed piping leading to the bioreactors. Enclosing structure 90 provides sheltered access to the bases of the bioreactors. Operators working in inclement weather will find that sheltered access to all of the components of the system is an important advantage of this novel arrangement.

Figure 4A:
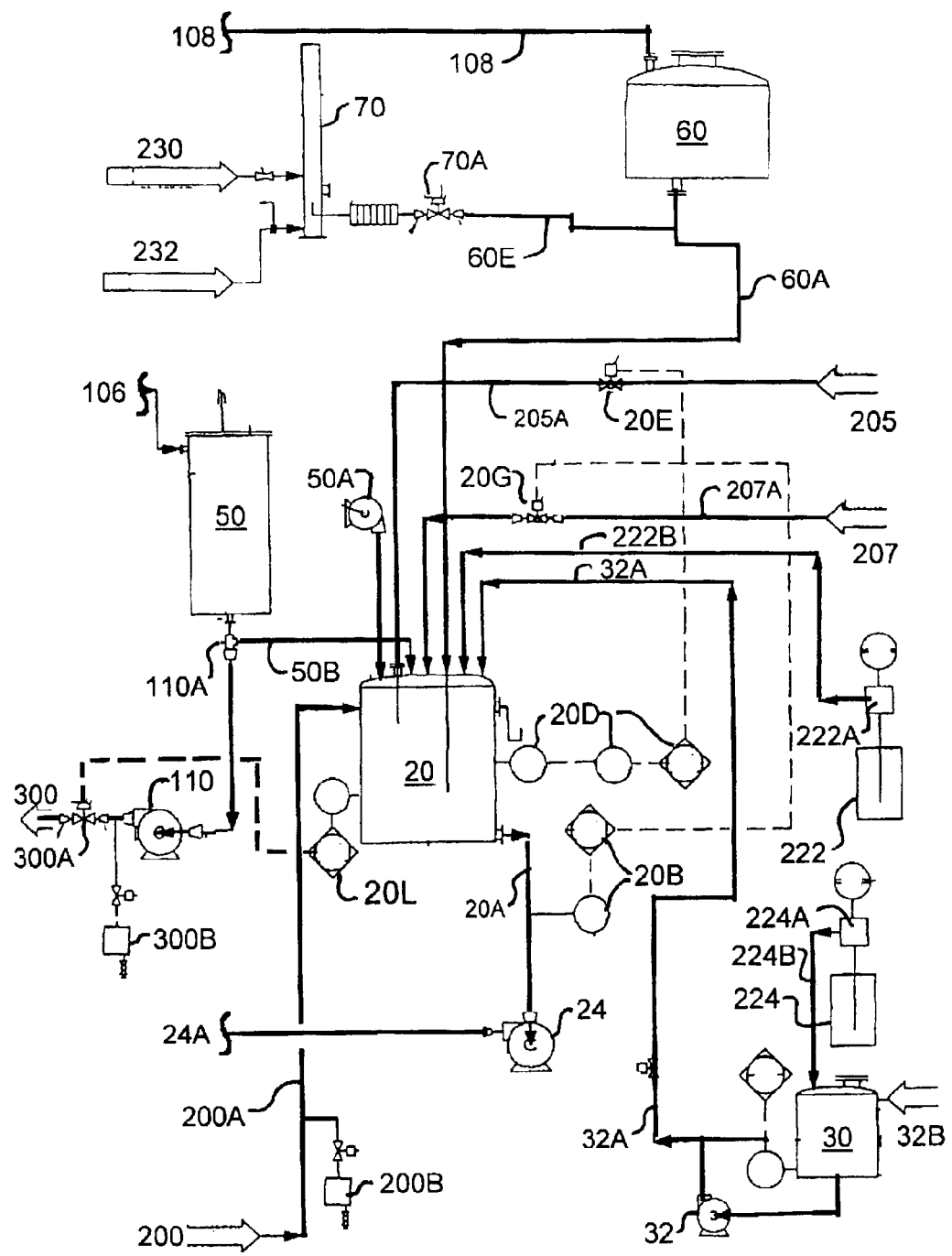
FIG. 4A is a process diagram showing the process arrangement of the components that are located in or on the bioreactor support module.
Figure 4B:
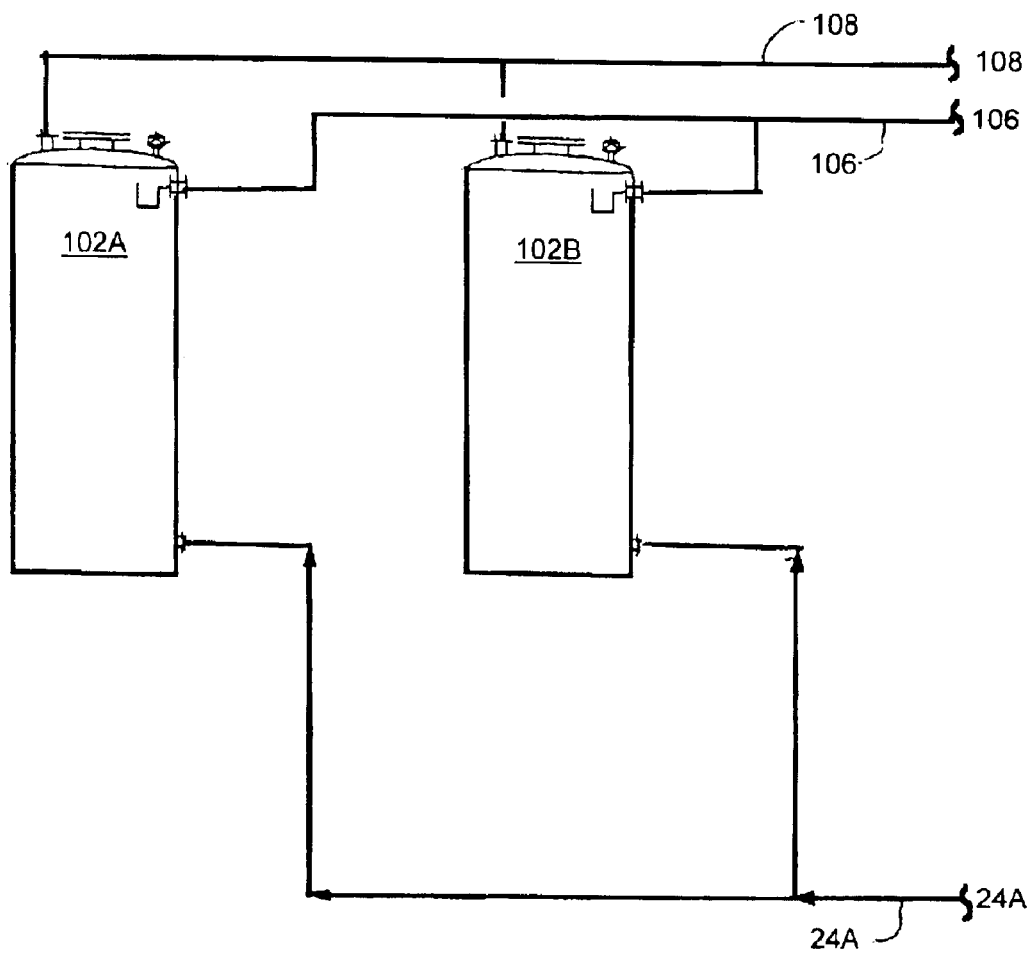
FIG. 4B is a process diagram showing the process equipment directly associated with the bioreactors.

FIG. 4A and FIG. 4B should be considered together. They provide a schematic diagram for illustrating the functions of the various components of the system. The components shown in FIG. 4A are located within or on top of bioreactor support module 12. Decarbonator 50, bio-gas scrubber 60 and bio-gas flare 70 are located on the upper level of bioreactor support module 12 while recycle tank 20, nutrient tank 30 as well as all three pumps: recycle pump 24, nutrient pump 32 and effluent discharge pump 110 are located on the lower level of bioreactor support module 12. The bioreactors 102A and 102B shown in FIG. 4B are located outside the bioreactor support module. Accordingly, almost all of the components shown in FIG. 4A and FIG. 4B with the notable exception of bioreactors 102A and 102B are mounted within or on top of bioreactor support module 12. One of the major advantages of this invention is that bioreactor support module 12 carries almost all of the equipment needed for the waste water treatment system so that most of the waste water treatment system can be fabricated and assembled in a controlled, efficient factory environment. Another major advantage of this invention is that the equipment mounted within and on top of bioreactor support module 12 is preferably sized to accommodate the operation of up to six bioreactors so that the system can be easily expanded with a minimum of additional cost.

As noted above, FIG. 4A illustrates the operation of equipment situated within and on bioreactor support module 12. A comparison of FIG. 4A and FIG. 4B will inform the reader that most of the system components as shown in the relatively crowded FIG. 4A are mounted within or on bioreactor support module 12. As will be explained in more detail below, support module 12 is designed to support the operation of bioreactors 102A and 102B and includes equipment for receiving and conditioning wastewater, supplying that conditioned waste water to the bioreactors at a controlled flow rate and receiving treated water from the bioreactors.

As can be seen in FIG. 4A, wastewater for treatment is received into the system from waste water source 200 via line 200A. A composite sampler 200B is used to sample the organic make up of the incoming waste water. Line 200A carries the entering waste water to recycle tank 20. Recycle tank 20 also receives a significant portion of the decarbonated, treated water that exists decarbonator 50 via line 50B. Recycle tank 20 also receives a small amount of condensate from bio-gas scrubber 60 via line 60A.

Decarbonated, treated water that does not enter recycle tank 20 is discharged from the system by effluent discharge pump 110 to effluent discharge line 300. This is the treated water suitable for release. Composite sampler 300S collects samples of the treated water for analysis. The amount of flow leaving in effluent discharge line 300 is roughly equivalent to the amount of flow entering from waste water source 200.

A constant level is maintained in recycle tank 20 using an arrangement well known in the art. A level indicator 20L senses the level of fluid in recycle tank 20 and transmits a responsive signal to a control valve 300B in effluent discharge line 300A. If the level in recycle tank 20 falls too low, the output of effluent discharge line 300A is decreased by partially closing valve 300A which causes more treated water from decarbonator 50 to flow through T fitting 110A into recycle tank 20 thus increasing the level in recycle tank 20. Conversely, if the level in recycle tank 20 rises too high, the output of effluent discharge line 300A is increased by opening of valve 300A which causes less treated water from decarbonator 50 to flow through T fitting 110A into recycle tank 20 thus decreasing the level in recycle tank 20.

Recycle tank 20 also receives other inputs directed toward controlling the nutrient mixture, pH and temperature of the mixture that is fed to the bioreactors. Recycle tank also receives and holds air for decarbonator 50. Decarbonator fan 50A blows air into recycle tank 20 which then passes to decarbonator 50 via line 50B. A steam source 205 provides steam to recycle tank 20 via line 205A when steam valve 20E is opened. Steam valve 20E opens in response to control signals from control panel 40 (FIG. 1). Control panel 40 receives temperature signals from temperature sensor and transmitter arrangement 20D. If the temperature in recycle tank 20 is too low, steam valve 20E opens to provide steam that is sparged into recycle tank 20. In a similar way a caustic solution from a caustic solution source is introduced by the action of valve 20G via line 207A in response to control panel signals that are responsive to pH measurements taken by pH sensor and transmitter 20B.

Appropriate concentrations of elements such as nitrogen, calcium, potassium, phosphorus and magnesium are required in small amounts by the biological culture in bioreactors 102A and 102B (FIG. 4A) for growth and maintenance. Most of these nutrients are supplied to recycle tank 20 from nutrient tank 30 via pump 32 and line 32A. Nutrient tank 30 receives phosphates from phosphate tank 224 via pump 224A and line 224B. The nutrients supplied to recycle tank 20 also include iron chloride from iron chloride tank 222 which is a 55 gallon drum. Iron chloride pump 222A delivers the iron solution to recycle tank 20 via line 222B. Other nutrients are added manually to nutrient tank 30. A fresh water supply 32B provides fresh water for making up the nutrient mixture in nutrient tank 30.

Recycle pump 24 provides a constant flow of a resulting diluted waste water having a proper temperature, pH and nutrient mix to bioreactors 102A and 102B. As can be seen in FIG. 4B, bioreactors 102A and 102B receive the incoming mixture at their bases via line 24A. The anaerobic granular cultures in bioreactors 102A and 102B convert the waste into methane and carbon dioxide as they sprout insoluble methane bubbles and rise to the top of the bioreactors, structures inside the bioreactors facilitate the separation of the methane bubbles from the granules to allow the granules to sink back to the bottom of the bioreactors to begin another cycle. Because waste water is entering each bioreactor from the bottom, treated water must drain from the top of each bioreactor via line 106 to decarbonator 50. Decarbonator 50 is a means for stripping a substantial portion of the dissolved carbon dioxide gas from the treated water. As noted above, treated, decarbonated water leaving decarbonator 50 either exits the system via effluent discharge pump 110 or re-enters recycle tank 20. Also as noted above, other bioreactors can be added to bioreactors 102A and 102B shown in FIG. 4B by merely extending lines 24A, 106 and 108.

Although a small amount of condensate from bio-gas scrubber 60 flows into recycle tank 20, the primary purpose of bio-gas scrubber 60 is not to supply condensate to recycle tank 20. The purpose of bio-gas scrubber 60 is to remove small amounts of highly noxious and corrosive hydrogen sulfide gas from the methane produced by bioreactors 102A and 102B. Bio-gas scrubber 60 is a means for removing hydrogen sulfide gas from the methane produced by bioreactors 102A and 102B. Those skilled in the art can select from a number of processes for performing this function. Bio-gas scrubber 60 receives methane gas from the bioreactors via line 108. Hydrogen sulfide in the methane gas, in this embodiment, is removed by an iron sponge media inside bio-gas scrubber 60. The resulting methane gas is then conveyed to bio-gas flare 70 via line 60E. Bio-gas flare 70 is also supplied by a natural gas source 230 for maintaining a pilot flame and an outside air source 232 to assist combustion. In the alternative, bioreactor methane leaving bio-gas scrubber 60 can be used as a fuel in other plant processes outside the waste water treatment process.

As can be seen from the forgoing description, bioreactor support module 12 encompasses a complex array of process equipment, control systems, pumps, valves and interconnecting lines that function to serve an array of bioreactors. All of the elements encompassed in bioreactor support module 12 which are illustrated in FIG. 4A as well as FIG. 1, FIG. 2 and FIG. 3 are preferably sized to accommodate an array of bioreactors. The inventors have found that sizing such equipment to support the operation of six bioreactors is economically optimized in terms of initial equipment size and costs and the demands of the market for system expandability. While six or perhaps eight may be a practical limit to the number of bioreactors that may be supported by a single bioreactor support module, the theoretical limit of how many could be accommodated may be much larger.

This arrangement allows the system fabricator to create a standardized design that can be assembled efficiently in a standardized, controlled, assembly process. Because of this, in the market, the costs of oversized equipment for a system supporting only one or two bioreactors is more than offset by the above noted cost savings inherent in assembling a modular system. Because the standardized, modular design can accommodate additional bioreactor units with an absolute minimum of costs, once installed, a system can be easily expanded to greatly multiply its initial capacity. Those skilled in the art will also appreciate how the bioreactor support module portion of the present invention can be designed to have standard interfaces. With standard interfaces, a purchasing facility can easily route their existing lines to meet those interfaces so that the installation of the module can be conducted with an absolute minimum of on-site effort. With standardized interfaces, the module can essentially be plugged into an existing facility with a minimum of effort.

Moreover, the arrangement of the bioreactor support module in combination with the closely spaced side by side pattern of bioreactors as illustrated in FIG. 3 makes it possible to add an enclosing structure 90 (shown in FIG. 1.). Enclosing structure 90 extends out between the bioreactors to provide sheltered access to the closely spaced bioreactors. This is a significant advantage for operators who must take samples from various points in the process or who may need to open or close valves leading to the bioreactors. The space saving, compact arrangement of equipment within the bioreactor support module and proximate location and close spacing of the bioreactors allows operators to access system equipment with an absolute minimum of walking time and distance. This decreases operator time and effort.

Numerous modifications and variations of these preferred embodiments may occur to those skilled in the art in light of this disclosure. Accordingly, it is expressly to be understood that these modifications and variations, and equivalents thereof, shall be considered to be within the spirit and scope of the invention as defined in following claims:

Having thus described the invention, what is claimed as new and desired to be secured by Letters Patent is:

1. A bioreactor support module for supporting the operation of at least one bioreactor, the at least one bioreactor of the type that receives a diluted waste water mixture containing organic waste and produces treated water substantially free of organic waste, the bioreactor support module comprising:
   (a) a waste water line for receiving waste water containing organic waste from a waste water source,
   (b) a recycle tank that receives and combines a first portion of the treated water from the at least one bioreactor and the waste water from the waste water source make the diluted waste water mixture for the at least one bio-reactor,
   (c) a recycle pump for pumping the diluted waste water mixture from the recycle tank to the at least one bioreactor,
   (d) a discharge pump for pumping a second portion of treated water from the at least one bioreactor to release a treated water effluent, and
   (e) a transportable frame sized for transport on a truck on a roadway for supporting the waste water inlet, the recycle tank, the waste water pump and the effluent pump.

2. The bioreactor support module of claim 1 wherein;
   the frame of the bioreactor support module includes a first level and a second level and the items of equipment of the bioreactor support module are divided into two sets including a first set of equipment items that are mounted on the first level of the frame prior to transport of the bioreactor support module and a second set of items that are mounted to the second level of the frame after transport of the bioreactor support module.

3. The bioreactor support module of claim 1 further comprising;
   a bio-gas scrubber for receiving a gaseous byproduct from the at least one bioreactor and removing hydrogen sulfide gas therefrom.

4. The bioreactor support module of claim 1 further comprising;
   a bio-gas scrubber for receiving gaseous byproduct from the at least one bioreactor and removing hydrogen sulfide gas therefrom, and
   a bio-bas flare for receiving scrubbed gas from the bio-gas scrubber and combusting the scrubbed gas.

5. The bioreactor support module of claim 1 further comprising;
   (a) sensors for sensing the temperature and pH of the waste water mixture,
   (b) a heat source and a source of caustic solution, and
   (c) a control device for receiving sensor readings of temperature and pH of the waste water mixture and directing the introduction of heat from the heat source and solution from the source of caustic solution such that the temperature and pH of the waste water mixture are maintained within predetermined ranges.

6. The bioreactor support module of claim 1 wherein;
   the components of the bioreactor support module are sized and adapted to support the operation between one and substantially six bioreactors.

7. A waste water treatment system for receiving waste water containing organic waste from a waste water source and for producing a treated water effluent, the modular waste water treatment system, comprising:
   (a) at least one bioreactor for receiving a waste water mixture laden with organic waste for anaerobic digestion to produce treated water, and (b) a bioreactor support module supporting the operation of at least one bioreactor, the bioreactor support module suitable for transport on a truck upon a public roadway, the bioreactor support module including (1) a waste water line for receiveing waste water containing organic waste from a waste water source, (2) a recycle tank that receives and combines a first portion of the treated water from the at least one bioreactor and the waste water from the waste water line to make the diluted waste water mixture, (3) a control panel for receiving sensor readings from temperature and pH sensors for sensing the temperature and pH of the waste water mixture and for directing the introduction of heat from a heat source and solution from a source of caustic solution into the waste water mixture such that the temperature and pH of the waste water mixture are maintained within predetermined ranges, (4) a means for determining the amount of waste present in the waste water mixture and a means for adding a solution containing nutrients from a nutrient solution source to the waste water mixture in proportion to the amount of waste determined to be present in the waste water mixture, (5) a recycle pump for pumping the diluted waste water mixture from the recycle tank to the at least one bioreactor, and (6) a discharge pump for pumping a second portion of the treated water from the at least one bioreactor for release as a treated water effluent.

8. The waste water treatment system of claim 7 wherein;
the components of the bioreactor support module are sized and adapted to support the operation between one and substantially six bioreactors.

9. A waste water treatment system for receiving waste water containing orgainic waste from a waste water source and for producing a treated water effluent, the modular waste water treatment system, comprising:

(a) at least one bioreactor for receiving a waste water mixture laden with organic waste for anaerobic digestion to produce treated water containing dissolved carbon dioxide and a gaseous byproduct including primarily methane and small amounts of hydrogen sulfide, and (b) a bioreactor support module for supporting the operation of the at least one bioreactor, the bioreactor support module including a frame sufficiently compact for transport on a truck on a roadway and items of equipment mounted to the frame, the items of equipment including;

(1) a nutrient source for supplying a mixture of nutrients for maintaining the cultures of microbes present in the at least one bioreactor, (2) a decarbonator for receiving treated water from the at least one bioreactor and removing dissolved carbon dioxide therefrom to produce a discharge of decarbonated treated water, the discharge split into a first portion and a second portion, (3) a recycle tank for receiving; (i) the first portion of the discharge of decarbonated treated water from the decarbonator, (ii) an intake flow of waste water from the waste water source, and (iii) nutrients from the nutrient source and for combining the decoarbonated treated water, the waste water and the nutrients to make the waste water mixture, (4) a recycle pump for pumping the waste water mixture from the recycle tank to the at least one bioreactor, and (5) an effluent pump for pumping the second portion of the decarbonated treated water from the decarbonator for release as a treated water effluent.

10. The modular waste water treatment system of claim 9 wherein,
the frame of the bioreactor support module includes a first level and a second level and the items of equipment of the bioreactor support module are divided into two sets, a first set of equipment items that are mounted on the first level of the frame prior to transport of the bioreactor support module and a second set of items that are mounted to the second level of the frame after transport of the bioreactor support module.

11. The modular waste water treatment system of claim 9 further comprising,
an enclosing structure that extends from the bioreactor support module to the at least one bioreactor to provide a sheltered access between the bioreactor support module and the at least one bioreactor.

12. The modular waste water treatment system of claim 9 wherein;
the equipment of the bioreactor support module is sized to support the operation of substantially between one and six bioreactors and the at least one bioreactor includes provisions for adding additional bioreactors.

13. The modular waste water treatment system of claim 9 wherein the bioreactor support module further comprises,
a bio-gas scrubber for receiving the gaseous byproduct from the at least one bioreactor and removing hydrogen sulfide gas therefrom.

14. The modular waste water treatment system of claim 9 wherein the bioreactor support module further comprises,
a bio-gas scrubber for receiving the gaseous byproduct from the at least one bioreactor and removing hydrogen sulfide gas therefrom and
a bio-bas flare for combusting the methane of the gaseous byproduct after the hydrogen sulfide gas has been removed.

15. The modular waste water treatment system of claim 9 wherein the bioreactor support module further comprises, (a) sensors for sensing the temperature and pH of the waste water mixture, (b) a heat source and a source of caustic solution, and (c) a control device for receiving sensor readings of temperature and pH and directing the introduction of heat from the heat source and solution from the source of caustic solution such that the temperature and pH of the waste water mixture are maintained within predetermined ranges.

16. A modular waste water treatment system for receiving waste water containing organic waste from a waste water source and for producing a treated water effluent, the modular waste water treatment system, comprising:

(a) at least one bioreactor for receiving a waste water mixture laden with organic waste for anaerobic digestion to produce treated water containing dissolved carbon dioxide and a gaseous byproduct including primarily methane and small amounts of hydrogen sulfide, and (b) a bioreactor support module for supporting the operation of the at least one bioreactor, the bioreactor support module including a frame sufficiently compact for transport by a truck on a roadway and items of equipment mounted to the frame, the items of equipment including;

(1) a bio-gas scrubber for receiving the gaseous byproduct from the at least one bioreactor and removing hydrogen sulfide gas therefrom, (2) a bio-bas flare for receiving gas from the bio-gas scrubber and burning off the remaining methane gas, (3) a nutrient tank for mixing and supplying nutrients for maintaining the cultures of microbes present in the at least one bioreactor, (4) a decarbonator for receiving treated water from the at least one bioreactor and removing dissolved carbon dioxide therefrom to produce a discharge of decarbonated treated water, the discharge split into a first portion and a second portion, (5) a recycle tank for receiving; (i) the first portion of the discharge of decarbonated treated water from the decarbonator, (ii) an intake flow of waste water from the waste water source, and (iii) nutrients from the nutrient source and for combining the decarbonated treated water, the waste water and the nutrients to make the waste water mixture, (6) a recycle pump for pumping the waste water mixture from the recycle tank to the at least one bioreactor, and (7) a discharge pump for receiving the second portion of the decarbonated treated water from the decarbonator and discharging it from the modular waste water treatment system to provide a treated water effluent.

17. The modular waste water treatment system of claim 16 wherein, the frame of the bioreactor support module includes a first level and a second level and the items of equipment of the bioreactor support module are divided into two sets, a first set of equipment items that are mounted on the first level of the frame prior to transport of the bioreactor support module and a second set of items that are mounted to the second level of the frame after transport of the bioreactor support module.

18. The modular waste water treatment system of claim 16 further comprising, an enclosing structure that extends from the bioreactor support module to the at least one bioreactor to provide a sheltered access between the bioreactor support module and the at least one bioreactor.

19. The modular waste water treatment system of claim 16 wherein;

the equipment of the bioreactor support module is sized to support the operation of substantially between one and six bioreactors.

20. The modular waste water treatment system of claim 16 wherein;

the equipment of the bioreactor support module is sized to support the operation of substantially between one and six bioreactors and the at least one bioreactor includes provisions for adding additional bioreactors.

21. The modular waste water treatment system of claim 16 wherein the bioreactor support module further comprises, (a) sensors for sensing the temperature and pH of the waste water mixture, (b) a heat source and a source of caustic solution, and (c) a control device for receiving sensor readings of temperature and pH and directing the introduction of heat from the heat source and solution from the source of caustic solution such that the temperature and pH of the waste water mixture are maintained within predetermined ranges.

22. A modular waste water treatment system for receiving waste water from a waste water source containing organic waste and for producing a treated water effluent, the modular waste water treatment system, comprising:

(a) at least one bioreactor for receiving a waste water mixture laden with organic waste for anaerobic digestion to produce treated water substantially free of organic waste, and (b) a bioreactor support module encompassed within a frame adapted for transport by a truck upon a public roadway, the bioreactor support module including equipment for (1) receiving waste water from a waste water source, (2) conditioning the waste water within ranges of temperature, pH and nutrient concentration to make a waste water mixture suitable for intake by the at least one bioreactor, (3) controlling the rate of flow of the waste water mixture to the at least one bioreactor and (4) receiving treated water from the at least one bioreactor for discharge as a treated water effluent.

23. The modular waste water treatment system of claim 22 wherein;

the equipment of the bioreactor support module is sized to support the operation of substantially between one and six bioreactors.

24. The modular waste water treatment system of claim 22 wherein;

the equipment of the bioreactor support module is sized to support the operation of substantially between one and six bioreactors and the at least one bioreactor includes provisions for adding additional bioreactors.

25. The modular waste water treatment system of claim 22 further comprising, an enclosing structure that extends from the bioreactor support module to the at least one bioreactor to provide a sheltered access between the bioreactor support module and the at least one bioreactor.

26. The modular waste water treatment system of claim 22 wherein;

the equipment of the bioreactor support module is sized to support the operation of substantially between one and six bioreactors and the at least one bioreactor includes provisions for adding additional bioreactors and wherein, the modular waste water treatment system further comprises an enclosing structure that extends from the bioreactor support module to the at least one bioreactor to provide a sheltered access between the bioreactor support module and the at least one bioreactor.

* * * * *